United States Patent

[11] 3,622,788

[72] Inventor Raymond W. Briggs
Los Angeles, Calif.
[21] Appl. No. 849,218
[22] Filed Aug. 11, 1969
[45] Patented Nov. 23, 1971
[73] Assignee Hughes Aircraft Company
Culver City, Calif.

[54] TARGET SEARCH AND TRACK SYSTEM WITH DUAL MODE SCAN CAPABILITY
12 Claims, 9 Drawing Figs.

[52] U.S. Cl. ................................................. 250/83.3,
178/7.88, 356/152
[51] Int. Cl. ................................................. G01t 1/16,
H01j 29/02
[50] Field of Search............................................ 178/7.88,
7.6; 250/83.3, 20.3; 356/152, 141

[56] References Cited
UNITED STATES PATENTS
3,127,516  3/1964  Ammerman et al. .......... 250/203
3,388,262  6/1968  Stutz ............................ 356/152
3,470,377  9/1969  Le Febre et al. .............. 356/152
3,491,969  1/1970  Muldoon et al. .............. 250/203

Primary Examiner—Rodney D. Bennett, Jr.
Assistant Examiner—N. Moskowitz
Attorneys—James K. Haskell and Walter J. Adam ABSTRACT: An infrared (IR) tracker receiver for searching and tracking a target from which IR energy is received. The receiver includes a linear detector array with a pair of chevron detectors on opposite sides of the center detector in the linear array. The receiver, which includes a scanning mirror, which is rotatable about an axis parallel to the linear array, is operable in a search mode in which the linear array is scanned back and forth over a moderate field of view. IR radiation, detected by the detectors, is used to generate error signals which are used to control the position of a reflecting mirror, which reflects IR radiation from a target to the scanning mirror, so as to cause the IR radiation to be detected at the center of the field of view. When the error signals fall below selected threshold levels, the system is switched to a track mode in which the detectors are scanned over a relatively small field of view, to provide a high rate of track information.

INVENTOR.
RAYMOND W. BRIGGS,
BY
J K Haskell
ATTORNEY.

TARGET SEARCH AND TRACK SYSTEM WITH DUAL MODE SCAN CAPABILITY

BACKGROUND OF THE INVENTION

1. Field of the Invention

The present invention generally relates to an electro-optical scanning-type system and, more particularly, to a dual mode electro-optical scanning-type system, with an object-acquisition capability over a moderate field of view and a high accuracy track capability over a relatively small field of view.

2. Description of the Prior Art

Various electro-optical scanning-type devices are presently known, whose primary function is to acquire an object in the system's field of view and, once acquired, track the object. Among such devices are infrared receivers or trackers to which infrared energy from an object, such as a target, is directed. Once energy is received from the target, the receiver operates to continuously track the target, as a result of which accurate target coordinate information, such as target azimuth and target elevation, may be obtained.

One of the basic disadvantages of prior art systems is that therein the target acquisition and tract fields of view are approximately the same. In order to provide adequate acquisition capability, a relatively large field of view must be employed. However, if the same, or substantially the same, field of view is used for tracking, the tracking accuracy may not be, and often is not, as high as desired. Also, spurious radiation from nearby targets or other background is more likely to interfere with tracking if the track field of view is any larger than necessary. Thus, a need exists for an electro-optical scanning-type system in which different fields of view are employed for target acquisition and target tracking, in order to achieve a high accuracy tracking capability, and a restricted track field of view.

OBJECTS AND SUMMARY OF THE INVENTION

It is a primary object of the present invention to provide a new improved scanning-type system with advantageous target acquisition and tracking capabilities.

Another object of the present invention is to provide a novel, reliable, electro-optical scanning-type system with a variable field of view scanning capability.

A further object is to provide a novel, reliable IR tracker-type receiver with a variable field of view scanning capability.

A further object is to provide a novel, reliable electro-optical system with a wide angle scanning capability for target acquisition and a smaller angle scanning capability for accurate target tracking.

These and other objects of the invention are achieved by providing a linear array of detectors which are scanned back and forth through a relatively large field of view, by means of an oscillating or scanning mirror, which is made to rotate over one of the detectors and its output exceeds a selected threshold level, it indicates target detection. The position of the target in the scanning axis is given by the position of the scanning mirror at the time of detection, while the target position in the orthogonal axis is given by the particular detector in the array which detects the target.

After detection, a pointing device, such as a telescope or a tracking mirror, is moved to direct target energy to the center of the field of view of the system, so that a detector located at the center of the array, is the one which senses the target during each cycle of the mirror scanning or oscillation. When this condition is achieved the system switches to a track or fine angle mode of operation.

In this mode the scanning mirror is moved at the same rate as during the acquisition mode. However, the mirror scans over a much smaller angle. The error in the scanning axis is still determined by the scanning mirror position at the time the target is sensed by the center detector. Since the angle of oscillation of the scanning mirror is much smaller, a much higher tracking data rate is realized. The target position in the opposite or orthogonal axis is developed from the center detector and two chevron detectors. The error in this axis is determined by the angle through which the scanning mirror must move or rotate for a target to pass between the two chevron detectors. The total field of view in this orthogonal axis is the height of the center detector. When the target is at the field center the coordinates of the reflecting or tracking mirror may be utilized to provide target coordinate information.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
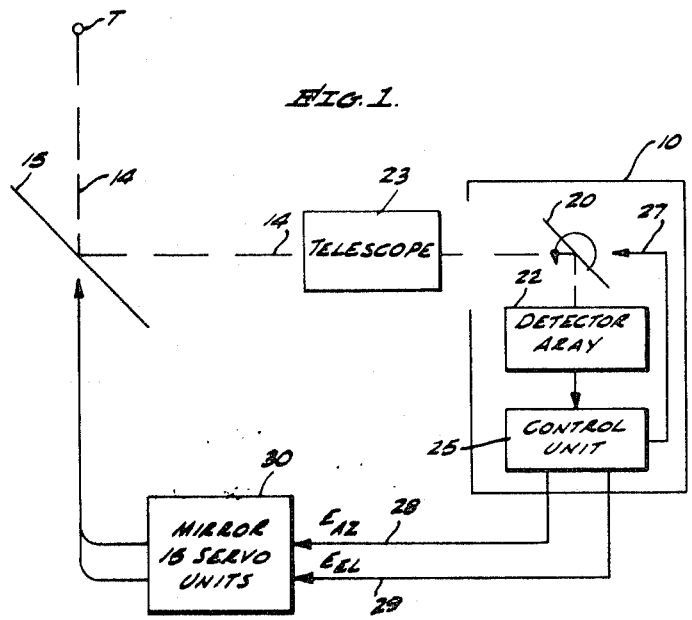
FIG. 1 is a simple block diagram of the present invention.

Reference is now made to FIG. 1, wherein reference numeral 10 designates the novel electro-optical scanning system of the present invention to which energy, such as infrared (IR) energy, represented by lines 14, is assumed to be reflected from a target T by means of a reflecting mirror 15. For explanatory purposes, the electro-optical scanning system of the present invention will be referred to as an infrared or IR tracker or receiver, since the teachings of the invention have been actually reduced to practice in connection with such a device. However, as will be apparent from the following, the teachings are not limited to an infrared receiver, but are applicable to any type system for acquiring and tracking a target from which energy is received.

As shown, the IR receiver 10 includes an oscillating or scanning mirror 20 to which the IR energy, which hereafter may be referred to simply as IR, from mirror 15 is directed. The IR from the oscillating mirror 20 is directed to a detector array 22. A telescope 23 is generally located in the energy path between mirrors 15 and 20, with the array 22 being located at the telescope focal plane, so that all the energy is focused onto the array. The array includes a plurality of detectors, whose outputs are supplied to a control unit 25 which control the scanning angle of the scanning mirror 20 to be a wide angle during target acquisition or search, and a much smaller or fine angle during target tracking. The control of the scanning mode of the scanning mirror 20 by the control unit 25 is represented in FIG. 1 by arrow 27. The control unit 25 further provides error signals, via lines 28 and 29, to mirror 15 servo units 30, which in the particular arrangement are assumed to control the rotational position of the mirror 15 with respect to a first axis of rotation, assumed to be extending perpendicular to the plane of the figure, as well as with respect to an axis of rotation extending in a vertical direction with respect to the plane of the figure. Hereafter these axes of rotation may be referred to as the perpendicular and vertical axes of rotation of mirror 15.

Figure 2:
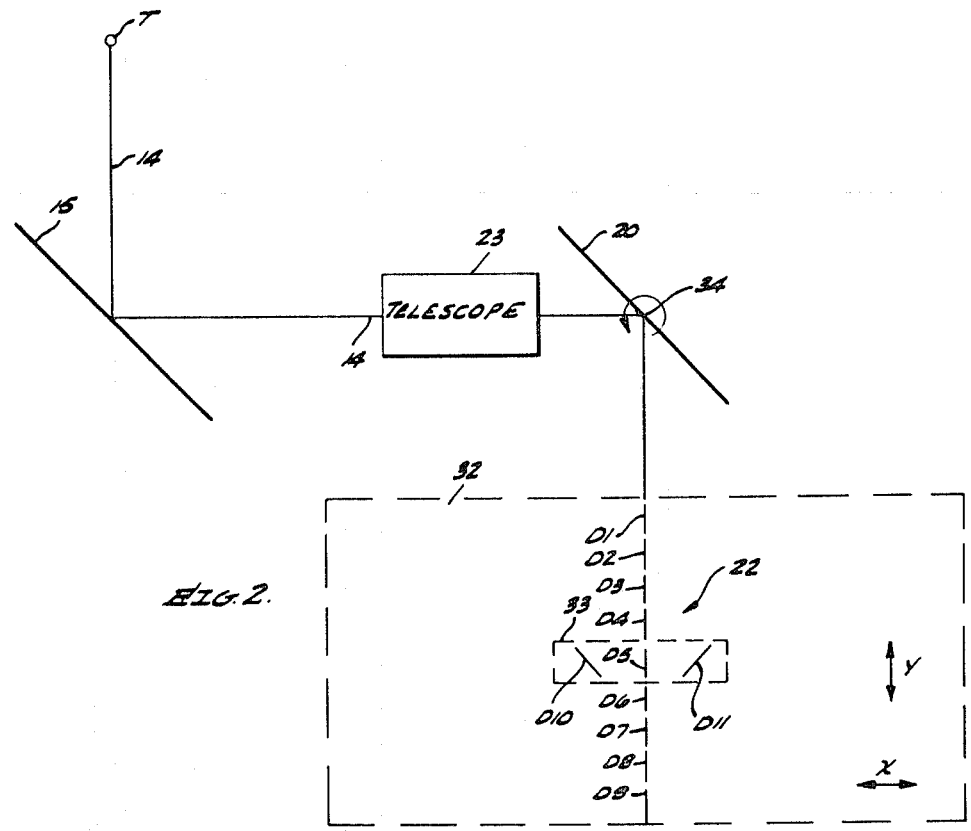
FIG. 2 is an optical path and detector array diagram.

Reference is now made to FIG. 2 wherein the detector array 22 is shown comprising a linear array portion of an odd number of detectors, such as 9, designated D1 through D9, with the center detector being D5. The number of detectors in the linear array is typically odd and not less than three In addition to the nine detectors in the linear array, a pair of chevron detectors, designated D10 and D11, are positioned on opposite sides of the center detector, D5.

In FIG. 2, dashed line 32 designates a search field through which the array of detectors is scanned back and forth when the mirror 20 is scanned over a wide angle, which is the case when the receiver is operated in a target acquisition or search mode. Dashed line 33 represents a track field through which the array is scanned back and forth when the receiver is operated in the track mode. In practice, the mirror is made to oscillate or rotate about an axis of rotation 34. The detector array 22 is placed in the receiver 10 so that the detectors D1-D9 lie in the focal plane of the telescope and in a direction parallel to the axis of rotation 34. However, for explanatory purposes only in FIG. 2 they appear to lie in a plane perpendicular to axis 34.

Basically, it is assumed that when the IR receiver is first turned on it is operated in the search mode. The mirror 15 is assumed to be in an initial position to reflect IR from the target T to the scanning mirror 20, so that as the array is scanned through the search or wide angle field 32, IR from the target is sensed by one of the detectors in the array. The scanning mirror 20 may be thought of as going through a null or zero position during each scanning cycle. For the particular arrangement, shown in FIG. 2, it should be appreciated by those familiar with the art that only when the mirror 15 is perfectly positioned about an axis, perpendicular to the plane of the figure, as represented by the solid line 15, will IR from a target be detected by one of the detectors when the scanning mirror 20 is at its null or zero position. In such a case the target is detected at or near the center of the field.

If however, the mirror 15 is at other than such a position as indicated by the dashed lines, the IR from the target will be sensed by one of the detectors in the linear array when the position of the mirror 20 is other than at its null position. Thus, the position of the scanning mirror, when target is detected by one of the detectors in the linear array, is an indication of the error in the position of the reflecting mirror 15 with respect to its normal zero azimuth position which is at 90° to the telescope axis. This angle of the scanning mirror which is represented by X, may be thought of as an error in azimuth (Az) or simply an azimuth error $E_{AZ}$. It should further be appreciated, that the particular detector in the linear array which senses the target is an indication of an error in the position of mirror 15 about its vertical axis of rotation, which is designated in FIG. 2 by arrow Y. This error may be thought of as error in elevation (EL), or simply elevation error $E_{EL}$.

As will be described hereafter in detail, the control unit 25 (see FIG. 1) includes circuitry to generate voltages which are indicative of the scanning mirror 20 positions. These voltages are then utilized to derive the errors in both azimuth and elevation which are supplied to the servo units 30 to adjust the position of the mirror 15 with respect to its two axes of rotation, and cause the target energy to be near the center of the field of view.

The receiver control unit 25 (see FIG. 1) is assumed to include a wide-angle scan generator 35 (see FIG. 3) and a small-angle scan generator 36 which produce sawtooth signals, designated 35s and 36s, respectively. The two signals are of equal slopes or rates except that they differ in amplitude and, consequently, in frequency. It is the output of either one of these generators which is supplied to an amplifier 40 through an adder 42. The output of the amplifier is used to control the rotation of the mirror 20 to cause it to scan the detector array. When the output of generator 35 is supplied, the scanning mirror 20 scans the array back and forth through the wide field 32 (see FIG. 2), while scanning the same array back and forth through the smaller field 33 when the output of generator 36 is supplied to the amplifier.

Since the position of the scanning mirror 20 is measured by an AC transducer a phase sensitive demodulator 45 is incorporated to provide a DC output, designated $E_M$, which is supplied to the adder 42. The magnitude of $E_M$ indicates the relative position of the scanning mirror 20 with respect to its null position, while the polarity of $E_M$ indicates the direction with respect to the null position.

Figure 4:
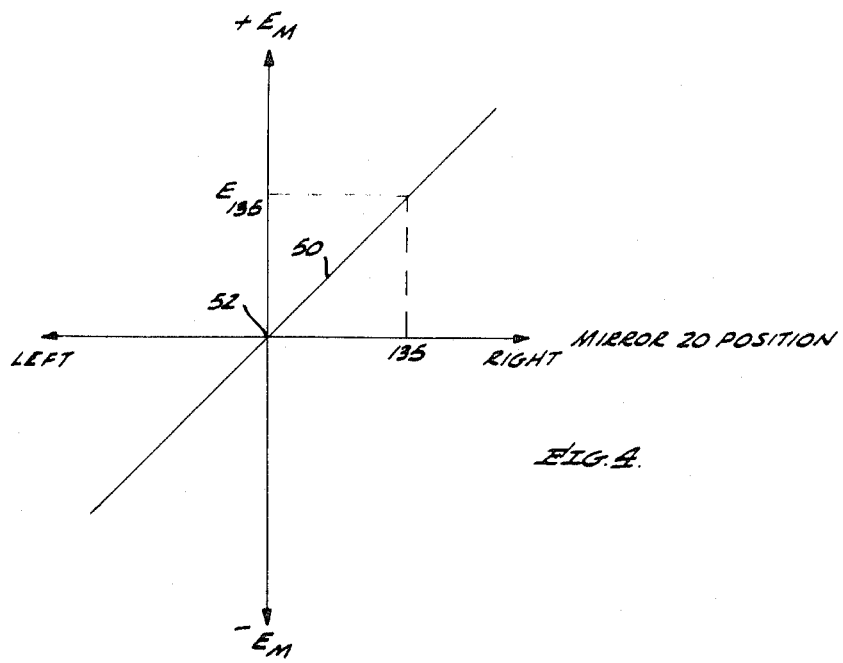
FIG. 4 is a plot of mirror position vs position-indicating voltage.

The relative magnitude and polarity of $E_M$ as a function of mirror 20 position are diagrammed in FIG. 4 and are represented by the straight line 50. From FIG. 4 it should thus be appreciated that $E_M$ increases in amplitude as the position of scanning mirror 20 increases from its null position. The signal $E_M$ is of a first polarity, such as positive (+), when the scanning mirror is to the right of its null position while having a negative (−) polarity when the mirror is to the left of its null position. The null position is represented in FIG. 4 by numeral 52.

Figure 5:
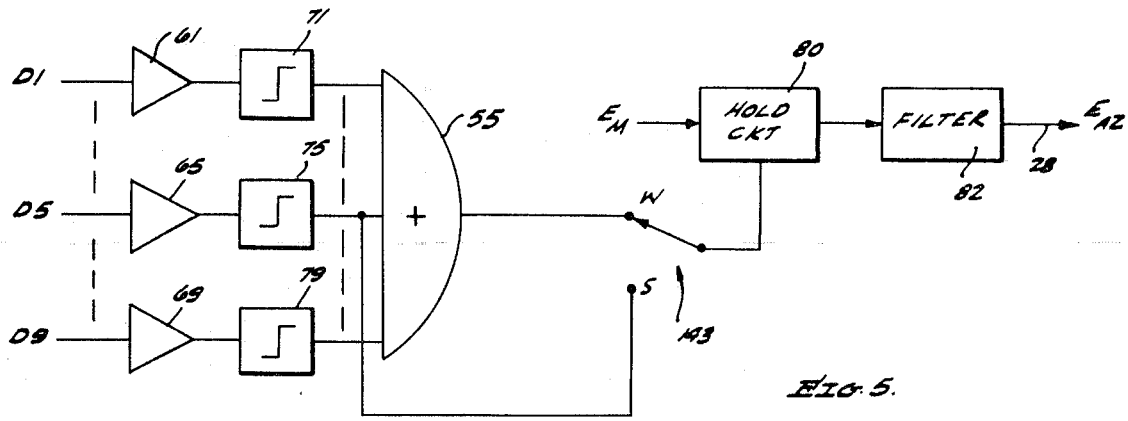
FIG. 5 is a block diagram of circuitry capable of generating a signal indicating position error in one axis.

Reference is now made to FIG. 5 which is a simplified block diagram of circuitry capable of producing the azimuth error, $E_{AZ}$ in accordance with the teachings of the present invention. As shown, each of the nine detectors D1-D9 in the linear array has associated therewith an amplifier and a threshold circuit. The outputs of the threshold circuits are connected to an OR gate 55. For simplicity, only amplifiers 61, 65 and 69 and threshold circuits 71, 75 and 79, associated with detectors D1, D5 and D9 respectively, are shown. In the search or wide angle mode, the output of the OR-gate gate 55 is supplied to a hold circuit 80 to which the voltage $E_M$ is supplied.

Whenever a target is sensed by any of the nine detectors and its output exceeds the threshold of its associated threshold circuit, the OR-gate 55 is enabled, triggering the hold circuit 80 to hold or store the $E_M$ voltage. Thus the voltage in the hold circuit indicates the scanning mirror position at the time of detection. This voltage, after filtering by a filter 82, represents the position error in the X axis (see FIG. 2) which is assumed to represent the azimuth error, $E_{AZ}$. This error signal is supplied to the servo unit 15 via line 28 to adjust the position of mirror 15 about its perpendicular axis of rotation, to bring the target to the center of the field, in the X axis. It should be clear that, since in the track or small-angle mode the field includes only detectors D5, D10 and D11, in this mode, the azimuth error is produced by the output of D5. Thus, in this mode it is the output of circuit 75 which is supplied to trigger the hold circuit 80.

From the foregoing it should be appreciated that for the determination of $E_{AZ}$, at least in the search mode, it is not significant which of the detectors in the linear array senses the target, since the nine detectors are in a line perpendicular to the scanning axis along which the error is detected. This however, is not the case when the error in the Y axis or in elevation, $E_{EL}$ is to be determined. Such error is directly related to the detector which senses the target and the position of the detector in the linear array. It is apparent from FIG. 2 that if the target T is detected by D1 it indicates a maximum $E_{EL}$ in a first direction from the center, while a maximum $E_{EL}$ in the opposite direction is indicated when D9 detects the target.

Figure 6:
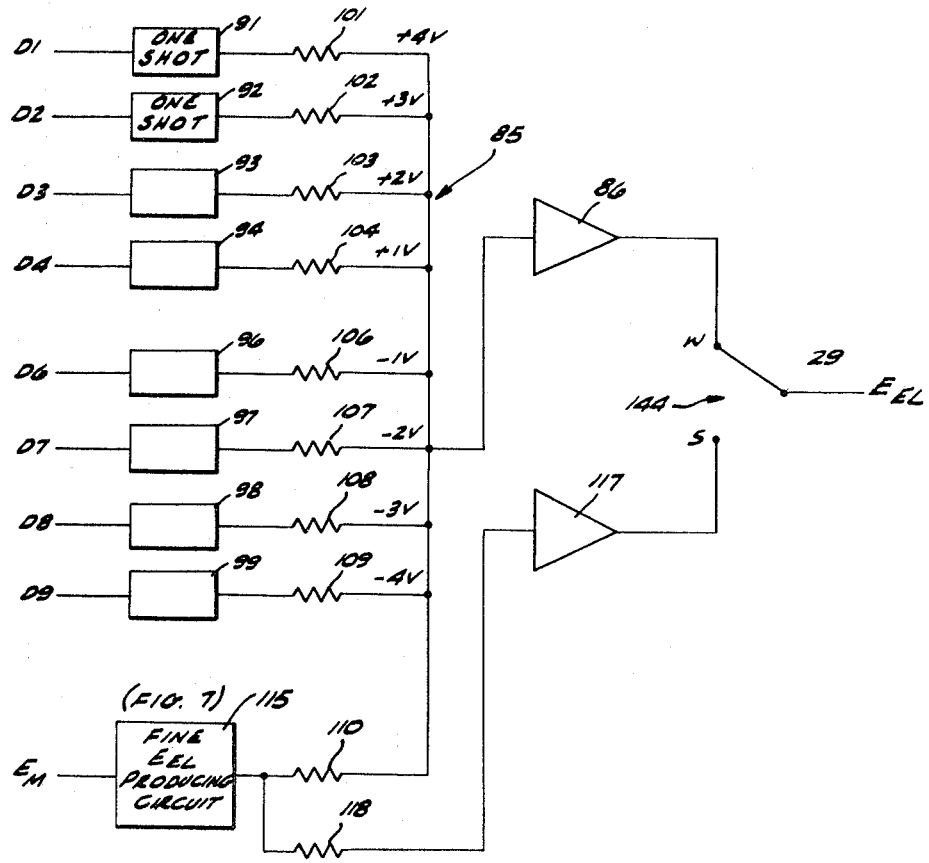
FIG. 6 is a block diagram of circuitry capable of generating a signal, indicating position error in a second axis.

In accordance with the teachings of this invention the elevation error, $E_{EL}$ may be produced by a circuit, as shown in FIG. 6. This circuit represents only an example of an implementation rather than as a limitation on the teachings disclosed herein. Basically in the elevation-error-producing circuit, the output of each of detectors D1-D4 and D6-D9 is connected through a one shot to a corresponding resistor in a weighted resistor matrix 85, which is connected to the input of an amplifier 86. The output of the amplifier 86 represents $E_{EL}$ in the search mode. The eight one shots are designated 91-94 and 96-99, while the resistors are designated by numerals 101-104 and 106-109.

Figure 7:
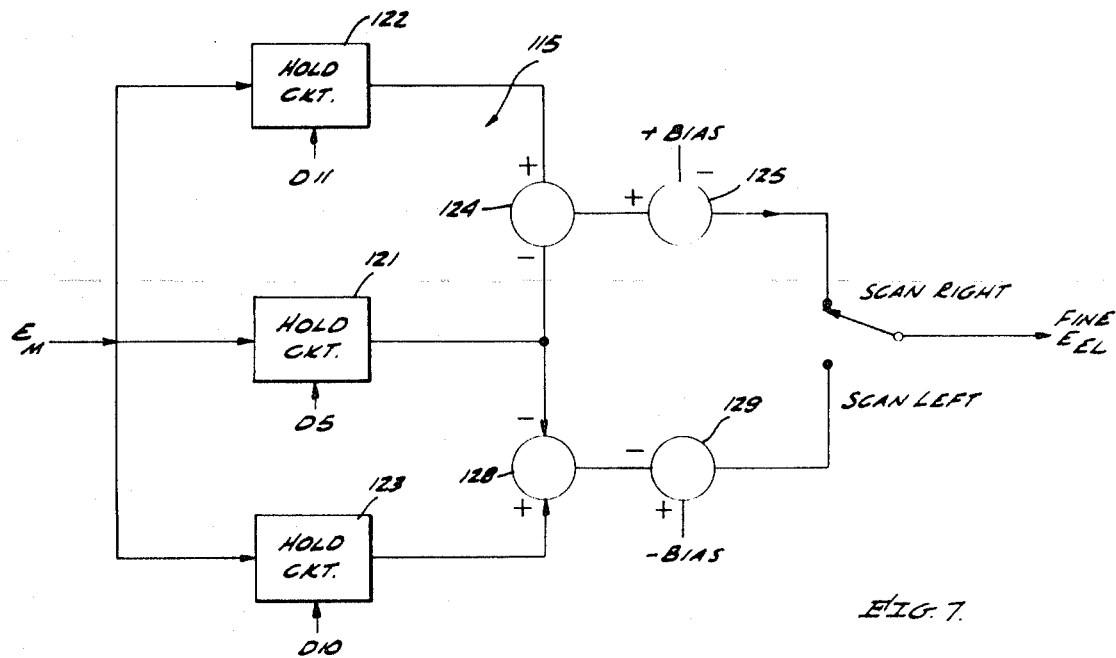
FIG. 7 is a block diagram of a circuit shown in FIG. 6.

Also forming a part of the matrix is a resistor 110, which is connected to a fine elevation error-producing circuit 115, which is diagrammed in detail in FIG. 7. Ignoring for a moment circuit 115, the resistor matrix 85 is weighted so that the amplitude and polarity of the voltage to amplifier 86 indicate which of the eight detectors D1-D4 and D6-D9 senses the target, thereby indicating the $E_{EL}$ magnitude and polarity or sense with respect to the field center. For example, the matrix may be weighted so that when D1 senses the target, +4 volts are supplied to the amplifier, while −4 volts are supplied when the target is sensed by D9. +3 volts and −3 volts are produced when the target is detected by D2 and D8, respectively, +2 volts and −2 volts when D3 and D7, respectively sense the target, while +1 volt and −1 volt are produced when the target is sensed by D4 and D6, respectively.

The output, $E_{EL}$ of this circuit is assumed to be supplied to servo units 30 (FIG. 1) to rotate the mirror 15 about its vertical axis of rotation to reduce the elevation error until the target is detected by the center detector D5. It is circuit 115 which generates $E_{EL}$ when the target is detected by D5. Its (circuit 115) output is supplied and combined in the resistor matrix 85 to insure that in the search mode the elevation error, $E_{EL}$ is continuously reduced until the target is detected by D5. In the track or small-angle mode it is the output of circuit 115, after amplification by amplifier 117, which represents $E_{EL}$. Amplifier 117 is connected to circuit 115 through a resistor 118.

Reference is now made to FIG. 7 which is a simple diagram of circuit 115. The circuit is shown to include three hold circuits 121, 122 and 123 which are independently triggered by the outputs of D5, D11 and D10 when the latter sense a target, to store or hold $E_M$ supplied thereto. The voltage, held in 121 is subtracted from the voltage held in 122, by a subtractor 124. The subtractor output is supplied to a second subtractor 125. In 125, a fixed bias voltage is subtracted from the output of subtractor 124 and the resultant is the fine $E_{EL}$ when the scanning mirror 20 scans the field to the right.

In an analogous arrangement the voltage in 121 is subtracted in a subtractor 128 from that in hold circuit 123. A negative bias voltage is supplied to a subtractor 129 wherein the output voltage of subtractor 128 is subtracted from the negative bias voltage. It is the output voltage of subtractor 129 which represents the fine $E_{EL}$, when the scanning mirror scans the field to the left.

Figure 8:
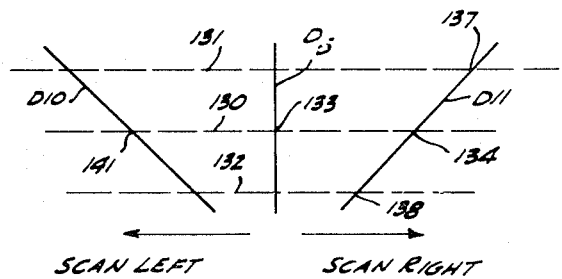
FIG. 8 is a partial diagram of the detector array shown in FIG. 2.

The operation of the circuit 115 may best be explained in conjunction with FIG. 8 which is an expanded view of detectors D5, D10 and D11, and in conjunction with FIG. 4 which, is the $E_M$ vs MIRROR POSITION graph. In FIG. 8, dashed line 130 represents zero elevation error, line 131 represents a positive $E_{EL}$ in which the target is detected above the field center, and line 132 represents a negative $E_{EL}$, in which the target is detected below the field center.

Let it be assumed for a moment that the azimuth error, $E_{AZ}$ is zero, that $E_{EL}$ is zero and the mirror scans to the right. In such a case when the target is detected by D5, at point 133, $E_M$ is zero, since zero azimuth error is assumed. However, when the target is detected by D11 at point 134, $E_M$ is not zero. Rather, it equals a voltage depending on the fixed distance between points 133 and 134 and, therefore, the voltage is a function of the degree of angular rotation of the scanning mirror 20 which is required from its null position to direct the target to D11. Let it be assumed that this mirror position is as indicated by point 135 in FIG. 4. Consequently, when D11 detects the target at point 134 when $E_{EL}$ is zero, $E_M$ is positive and is equal to $E_{135}$. For explanatory purposes let $E_{135}$=+4 volts. In such a case the fixed bias voltage which is applied to subtractor 125 (FIG. 7) is +4 volts.

With the foregoing assumptions it should be seen that when the target is detected by D5 at point 133 $E_M$=0. Thus, 0 volts are held in circuit 121. Then, when the target is detected by detector D11 at 134, $E_M$=+4 volts. Consequently, +4 volts are held in circuit 122. Therefore, the output of subtractor 124 is +4−(+0)=+4 volts. However, due to the +4 volts bias voltage which is applied to subtractor 125, the output of the latter is +4−(+$)=0 volts, thereby indicating zero elevation error.

If, however, a positive elevation error is present (see line 131 in FIG. 8), when the target is detected by D11 at point 137, $E_M$ is greater than +4 volts. Consequently, the output of subtractor 124 is greater than the +4 volts bias, applied to 125. As a result, a net positive voltage is produced. The magnitude and polarity of this voltage indicate the magnitude and sense or direction of the elevation error $E_{EL}$. Likewise, if a negative elevation error is present (see line 132 in FIG. 8), when the target is detected by D11 at point 138 $E_M$ is less than +4 volts. Consequently, the output of subtractor 124 is less than +4 volts, so that when the +4 volts bias is subtracted therefrom in 125, a net negative voltage is produced, indicating a negative elevation error.

The performance of the hold circuits 121 and 123 and subtractors 128 and 129 is fully analogous, for providing the fine $E_{EL}$ when scanning is to the left. Basically, the negative bias voltage which is applied to subtractor 129 is chosen to equal $E_M$ when the target is detected by D10 at point 141, in the absence of an elevation error, so that the net output of subtractor 129 is zero. In the particular example this negative bias voltage is −4 volts.

Herebefore, it has been assumed that the azimuth error, $E_{AZ}$ is zero. It should be pointed out that any azimuth error which may be present does not affect the production of the fine elevation error. An azimuth error causes hold circuit 121 to store an $E_M$ equal to other than zero, when the target is detected by detector D5. However, the value of the $E_M$ stored in either circuit 122 or 123, depending on the scan direction, is shifted by an equal magnitude, which after subtraction by subtractor 124 or 128 cancels out. Thus, any azimuth error has no effect on the fine $E_{EL}$ which circuit 115 is capable of providing.

Figure 3:
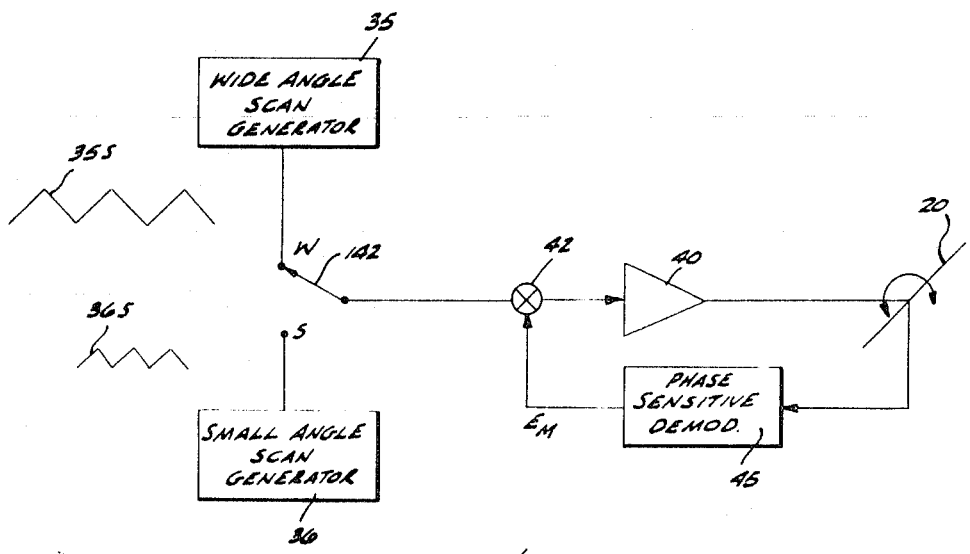
FIG. 3 is a block diagram of the circuitry necessary to control the scanning of a scanning mirror shown in FIG. 1 in its two scanning modes.

In operation, when the receiver 10 is turned ON it is switched initially to operate in the search or wide-angle mode, as represented by the positions of switches 142, 143 and 144, shown in FIGS. 3, 5 and 6, respectively. The mechanical switches are presented as a simple example of devices for switching the receiver from one mode to the other. It is clear, however, that in practice, such mechanical switches may be too slow and that electronic switching would be employed. In these switches, when the switch arms are in contact with the W terminals, the search mode is performed, while in the track or small-angle mode the arms are in contact with the S terminals.

Once the receiver is in the search mode, the output of generator 35 (FIG. 3) is used to rotate the mirror 20 to scan the detector array back and forth over the wide or search field 32 (FIG. 2). Azimuth error, $E_{AZ}$ is produced by the circuit shown in FIG. 5, while elevation error $E_{EL}$ is produced by the circuit shown in FIG. 6. These errors are supplied to the servo units 30 via lines 28 and 29, respectively (FIG. 1) to adjust the position of mirror 15 to direct the target to the field center. Only when both errors fall below selected threshold levels, is the receiver switched to the track or small-angle mode. The positions of mirror 15 about its axes of rotation may be resolved and enclosed to provide highly accurate coordinate information of the tracked target.

Figure 9:
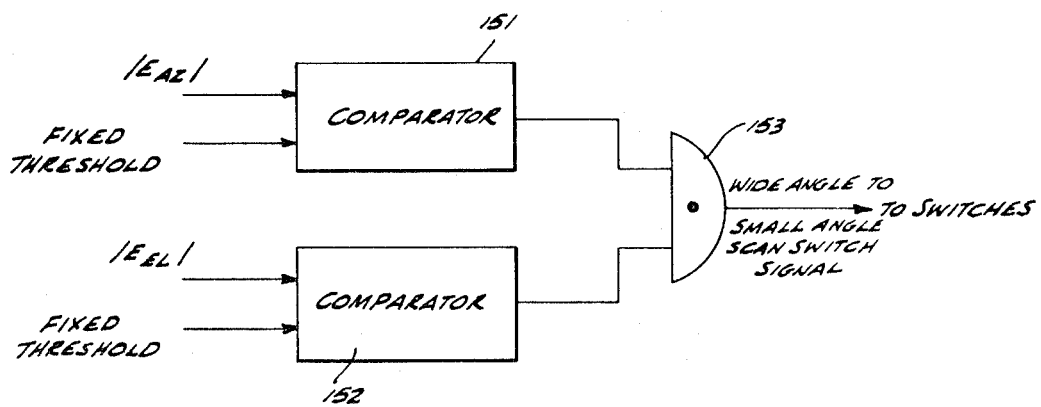
FIG. 9 is a diagram of a simple circuit capable of providing a mode switching signal.

The switching signal may be provided by the output of a circuit, shown in FIG. 9, to which reference is now made. Basically, the circuit may include two comparators 151 and 152 to which the absolute values of $E_{AZ}$ and $E_{EL}$ are respectively supplied. In each, the error is compared with a fixed threshold level. The outputs of the two comparators are connected to an AND-gate 153. Only when both errors fall below the threshold levels with which they are compared is gate 153 enabled to provide, a Search-to-Track switching control signal, to the various switches.

Once the receiver is switched to the track or small-angle mode, the field is limited to that shown in FIG. 2 by line 33. In this track mode the azimuth error is provided by the output of hold circuit 80 (FIG. 5) when the target is detected by detector D5, while the elevation error is derived by the output of circuit 115 (FIG. 7) as a function of the mirror positions, represented by $E_M$, at the times of target detection by detectors D5, D10 and D11.

It should be pointed out that the novel teachings of the present invention are not limited to the particular circuit arrangements, which have been herebefore described to explain the invention, rather than to limit its scope. It should further be pointed out that the invention is not limited to searching and tracking a target from which IR energy is received. Rather, the invention may be employed to search and track a target or object from which other types of energy, such as light, may be detected by the novel detector array of the present invention. It is the array configuration and the manner in which the detectors' outputs are used which produce the novel advantages of the invention, namely, the ability to search and acquire a target over a moderate field of view and provide a high accuracy track capability over a smaller field of view.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A system for searching and tracking an energy-providing object comprising:
    a rotatable scanning optical member;
    a variably positionable energy reflecting member for reflecting energy directed thereto from an object to said scanning optical member;
    position control means for controlling the position of said energy reflecting member;
    an array of energy-sensitive detectors, each providing an output signal indicating the detection of said object when energy from said optical member is directed thereto;
    means for controlling said system to operate in either a search mode or a track mode;
    first scan means for rotating with a predetermined angular rate said optical member in said search mode to scan said array of detectors back and forth through a first relatively large search field of view with a predetermined scan rate;
    second scan means for rotating substantially with said predetermined angular rate said optical member in said track mode to scan said array of detectors back and forth through a second relatively small field of view substantially with said predetermined scan rate; and
    control means for switching said system from said search mode to said track mode only when the energy from the target is directed to within defined boundaries from the field center.

2. The arrangement as described in claim 1 wherein said array of detectors includes a linear array of $n$ detectors, $n$ being odd and first and second detectors angularly disposed on either side of the center detector in said linear array, with the search field of view having a first dimension which is not less than the dimension between opposite ends of the end detectors in said linear array, and a second dimension along an axis, perpendicular to said linear array, which is a function of the extreme positions of said optical member when rotated by said first scan means, the track field of view having a first dimension which is at least equal to the height of said center detector and a second dimension along an axis perpendicular to the linear array which is not less than the furthest distance between any points on said first and second detectors.

3. The arrangement as described in claim 2 wherein said system includes error signal generating means responsive to the outputs of said detectors to provide error signals;
    means for supplying said error signals to said position control means to adjust the position of said energy-reflecting member to reflect energy to said optical member so that energy is received by said detectors at substantially the center of said field of view.

4. The arrangement as described in claim 3 wherein said error signal generating means includes first circuit means for generating a first error signal used by said position control means to adjust the position of said energy reflecting member about a first axis to reflect energy to said detectors through said optical member, with said first error signal being substantially zero when energy is detected by one of the detectors in the linear array when said optical member is in a null position, said error signal generating means further includes second circuit means for generating a second error signal, used by said position control means, to adjust the position of said energy-reflecting member about a second axis to reflect energy to said detectors through said optical member, with said second error signal being substantially zero when energy is detected by only the center detector in said linear array at a central point thereof.

5. The arrangement as described in claim 4 wherein said energy is infrared energy, said energy-reflecting member is a mirror rotatable by said position control means about two mutually perpendicular axes of rotation and said optical member is a rotatable scanning mirror.

6. The arrangement as described in claim 5 wherein said second circuit means, include means for deriving said second error signal as a function of the positions of said scanning mirror when energy is detected by said center detector and said first detector when the scanning mirror is rotatable in a first direction, and as a function of the positions of said scanning mirror when energy is detected by said center detector and said second detector when the scanning mirror is rotatable in a second direction opposite said first direction.

7. An energy tracker receiver comprising:
    an optical member, rotatable about a selected axis of rotation;
    an array of energy-sensitive detectors, each providing an output signal indicating the detection of energy directed thereto from said optical member;
    first scan means for rotating with a predetermined rate of rotation said optical member in a first mode to scan said array of detectors back and forth through a first relatively large field of view;
    second scan means for rotating substantially with said predetermined rate of rotation said optical member in a second mode to scan said array of detectors back and forth through a second relatively small field of view; and
    control means for switching said receiver from said first mode of rotation to said second mode of rotation only when the energy is directed to said detectors within defined boundaries from the field center.

8. The arrangement as described in claim 8 wherein said array of detectors includes a linear array of $n$ detectors, $n$ being odd and first and second detectors angularly disposed on either side of the center detector in said linear array, with the first field of view having a first dimension which is not less than the dimension between opposite ends of the end detectors in said linear array, and a second dimension along an axis, perpendicular to said linear array, which is a function of the extreme positions of said optical member when rotated by said first scan means, the second field of view having a first dimension which is at least equal to the height of said center detector and a second dimension along an axis perpendicular to the linear array which is not less than the furthest distance between any points on said first and second detectors.

9. The arrangement as described in claim 8 wherein said receiver further includes error signal generating means for providing a first error signal as a function of the position of said optical member when anyone of the detectors in the linear array detects energy, and a second error signal as a function of the detector in said linear array which detects said energy.

10. The arrangement as described in claim 9 wherein said receiver includes means for generating said second error signal, when said optical member is rotated in said second mode of rotation, as a function of the positions of said optical member when energy is detected by said center detector and the first and second detectors angularly disposed on either side thereof.

11. The arrangement as described in claim 10 wherein said first and second detectors are disposed on either side of said center detector to form a chevron configuration.

12. The arrangement as described in claim 10 wherein said energy is infrared energy.

PO-1050
(5/69)

UNITED STATES PATENT OFFICE
CERTIFICATE OF CORRECTION

Patent No. 3,622,788  Dated November 23, 1971

Inventor(s) Raymond W. Briggs

It is certified that error appears in the above-identified patent and that said Letters Patent are hereby corrected as shown below:

Column 1, before "Background of the Invention," insert as a new paragraph:

--The invention herein described was made in the course of or under a contract or subcontract thereunder, with the U. S. Navy.-- (page 2, lines 5 through 7)

Claim 8, line 1, before "wherein" delete "8" and substitute --6-- (Amendment dated May 12, 1971)

Signed and sealed this 22nd day of May 1973.

(SEAL)
Attest:

EDWARD M. FLETCHER, JR.
Attesting Officer

ROBERT GOTTSCHALK
Commissioner of Patents